UNITED STATES PATENT OFFICE.

AMANDA T. JONES AND LE ROY C. COOLEY, OF NEW YORK, N. Y.

IMPROVEMENT IN PRESERVING FRUIT, VEGETABLES, &c.

Specification forming part of Letters Patent No. 139,581, dated June 3, 1873; application filed January 11, 1873.

*To all whom it may concern:*

Be it known that we, AMANDA T. JONES and LE ROY C. COOLEY, of New York, in the county and State of New York, have invented a new and valuable Improvement in a Process for Canning Fruit; and we do hereby declare that the following is a full, clear, and exact description of the construction and operation of the same.

Our invention relates to means for preserving fruit, vegetables, &c.; and consists in the process, hereinafter described, by which the air is exhausted both from the vessel in which the fruit is placed and from the cells or pores of the fruit itself.

Our process is as follows, namely: We place the fruit to be preserved in a suitable vessel adapted to the purpose, and, by means of an air-pump, exhaust the air therefrom as far as practicable. At the same time we fill the vessel with fluid, (preferably a sirup of sugar and water,) at such a temperature as will cause vapor to arise and boiling to take place therein. This will occur at, say, from 100° to 120° Fahrenheit by reason of the vacuum. We keep the contents of the vessel at this point, which we call "cool boiling," until the bubbles of air cease to rise on the surface of the fluid, and we judge that the tissues of the fruit are softened.

We find by experiment that the fluid will boil vigorously in the vacuum created as above described, and thereby the tissues of the fruit be softened and the air expelled from its cells without subjecting such fruit to the chemical change called cooking.

When the process above described is completed we seal the vessel hermetically.

The vessel may be filled with fluid before exhausting the air by a pump, or it may be filled afterward.

We find, also, that very good results may be obtained by pouring in fluid, after exhaustion by the pump, at a degree of temperature that will simply cause vapor to rise without the boiling process; but in the course of our experiments we have invariably obtained the best results when the boiling in a vacuum is resorted to.

An apparatus in which the above-described process may be profitably used it is expected will soon be made the subject of an application for a patent; and, also, it is the intention of one of these applicants to apply for a patent upon a fruit-jar adapted to this process.

It is apparent that vegetables, meats, and other like substances are susceptible of preservation by the process herein described.

What we claim as our invention, and desire to secure by Letters Patent, is—

The process herein described for preserving fruit, vegetables, and other perishable articles of food, substantially as specified.

In testimony that we claim the above we have hereunto subscribed our names in the presence of two witnesses.

AMANDA T. JONES.
LE ROY C. COOLEY.

Witnesses:
 M. H. GREENE,
LOUIS DREYER.